(12) United States Patent
Taylor

(10) Patent No.: US 8,458,951 B2
(45) Date of Patent: Jun. 11, 2013

(54) LEADER STORAGE DEVICE

(76) Inventor: William H Taylor, South Deerfield, MA (US)

( * ) Notice: Subject to any disclaimer, the term of this patent is extended or adjusted under 35 U.S.C. 154(b) by 0 days.

(21) Appl. No.: 13/301,903

(22) Filed: Nov. 22, 2011

(65) Prior Publication Data

US 2012/0131844 A1     May 31, 2012

Related U.S. Application Data

(60) Provisional application No. 61/458,525, filed on Nov. 26, 2010.

(51) Int. Cl.
*A01K 97/06*     (2006.01)

(52) U.S. Cl.
USPC ................................................ 43/54.1

(58) Field of Classification Search
USPC ......... 43/54.1, 57.1, 57.2; 206/63.3; 242/125, 242/125.1–125.3, 127, 222
See application file for complete search history.

(56) References Cited

U.S. PATENT DOCUMENTS

| | | | |
|---|---|---|---|
| 966,609 A | | 8/1910 | Shannon |
| 1,550,790 A | * | 8/1925 | Dumouchel ................... 43/57.1 |
| 1,859,842 A | * | 5/1932 | Radford ..................... 242/125.2 |
| 2,050,944 A | | 8/1936 | Greggains |
| 2,663,114 A | | 12/1953 | Warner |
| 2,749,654 A | * | 6/1956 | Harris ............................. 43/57.2 |
| 2,791,863 A | * | 5/1957 | Sweeney ........................ 43/57.2 |
| 2,924,908 A | * | 2/1960 | Lisowy ........................... 43/57.1 |
| 3,317,068 A | * | 5/1967 | Betner ........................... 215/233 |
| 3,564,755 A | * | 2/1971 | Lindgren ....................... 43/57.2 |
| 3,728,839 A | * | 4/1973 | Glick .............................. 53/425 |
| 3,785,080 A | * | 1/1974 | Wallace .......................... 43/54.1 |
| 4,161,075 A | * | 7/1979 | Eubanks et al. ............... 40/309 |
| 4,258,843 A | * | 3/1981 | Wymer ......................... 206/63.3 |
| 4,290,223 A | | 9/1981 | Ostenberg et al. |
| 4,549,649 A | * | 10/1985 | Roshdy ........................ 206/63.3 |
| 4,577,433 A | * | 3/1986 | Jones ............................. 43/57.2 |
| 4,631,856 A | * | 12/1986 | Born ............................... 43/57.1 |
| 4,924,621 A | * | 5/1990 | Hawranik et al. ............. 43/57.2 |
| 5,269,090 A | * | 12/1993 | Richards et al. .............. 43/57.2 |
| D347,989 S | * | 6/1994 | DeWard ......................... D8/358 |
| 5,386,662 A | * | 2/1995 | Vader et al. ................... 43/57.2 |
| 5,438,791 A | * | 8/1995 | Sherrod ......................... 43/57.2 |
| 5,490,624 A | | 2/1996 | Yavitz |
| 5,915,947 A | | 6/1999 | Tomlinson |
| 6,792,712 B1 | | 9/2004 | Houg-Blymyer |
| 7,963,476 B2 | | 6/2011 | Hemkens et al. |
| 2009/0119974 A1 | * | 5/2009 | Rieux ............................. 43/54.1 |

* cited by examiner

*Primary Examiner* — Kimberly Berona
(74) *Attorney, Agent, or Firm* — Carter, DeLuca, Farrell & Schmidt, LLP

(57) ABSTRACT

A card-like device for storing and retrieving multiple sizes of leader materials in a shirt pocket size configuration in which all the housed leader material sizes are clearly and always visible and which permits quick and easy finding of the stored leader material ends, and firm retention and easy grasping of same.

16 Claims, 5 Drawing Sheets

LEADER STORAGE DEVICE

CROSS-REFERENCE TO RELATED APPLICATIONS

This application claims the benefit of U.S. Provisional Patent Application Ser. No. 61/458,525, filed Nov. 26, 2010 by the present inventor, the entire contents of which are incorporated herein by reference as if repeated herein.

TECHNICAL FIELD

This application relates to devices and methods for storing lines, and more particularly, to devices and methods for storing leader tippet materials which are thin monofilament nylon lines used by anglers.

BACKGROUND

Fly-fishing anglers employ fine, barely visible lines, or "leaders" between an artificial fly and a much heavier fly line in order to help fool a fish into taking the fly. Leaders have evolved from strands of knotted horsehair back in medieval times, through an era of silkworm gut in the 1800's and early 1900's to the present era of nylon monofilament developed by DuPont in 1938.

Anglers have always had the need to store the leader materials in their tackle bags or vests while on the stream. During the silkworm gut era, leaders were commonly stored in tin boxes which contained dampened felt pads to keep the materials pliable. (See, for example U.S. Pat. No. 2,050,944 to Greggains). Since the development of nylon monofilament, leader materials have almost universally been stored on plastic spools. Anglers generally carry several spools of leader "tippet" materials in different line diameters to match streamside needs.

Having to carry several spools creates issues for the angler. If the spools are all located in one pocket, the angler has to "fish" for the size he wants, typically getting the wrong size at first and having to repeat the process until he gets the right one. If the spools are separated and given a designated spot in a vest pocket or bag, then the angler must, of course, buy and use such a vest or bag. However, unless the angler is very well organized in his life style and goes fishing frequently, he or she will likely forget which pocket contains which size material.

Further, the additional bulk of the angler's gear created by a multiplicity of spools is quite undesirable in view of the typically large number of other accessories he or she carries including fly boxes, fly and fly line floatants, split shot, strike indicators, clippers hemostats, sunglasses, landing net, wading staff, etc.

The angler's issues continue once the correct spool is found. The end of the tippet material is supposed to be readily visible and easy to grasp but this unfortunately is not always the case. The elastic bands on the spools which are used to keep the material from unspooling when not in use often obscure the leader material ends. Finding the end requires removal of the band and searching for the end which is usually concealed among the remaining coils of material. Removal of the elastic band and accessing the leader end sometimes requires a pick-like tool since the width of the spool is too narrow to get a thumb and a finger into the spool to grasp the leader end. If the band is not put back in place a mess of unspooled, troublesome leader material ends often results. Further, bands not restored to the spool are destined to get lost.

One solution to this issue has been offered by some suppliers of tippet material in the form of an elastic band with built-in eyelet through which the tippet end is fed. See, for example, U.S. Pat. No. 6,792,712 to Houg-Blymer. While this constitutes an improvement, at times the elastic band can be inadvertently rotated on the spool causing the leader end to disappear, making the original problem return.

A further issue with elastic bands is that they are opaque, preventing a view of the remaining amount of material left on the spool. The angler's discovery of an empty tippet spool at a critical time on the stream can be a very upsetting experience.

Attempts at better organization in storing tippet material include U.S. Pat. No. 4,290,223 to Ostenberg et al.; U.S. Pat. No. 7,963,476 to Hemkens et al.; and U.S. Pat. No. 5,490,624 to Yavitz.

All of the above inventions fail to achieve compactness and actually promote the problem of gear bulk by stacking the spools one on top of the other. A thick stack of spools precludes easy insertion into and removal of the spool stack from the vest pocket.

Both Hemkens' and Ostenberg's devices require expensive injection molding for manufacture resulting in either a higher product sell price or unacceptably low profit margin when only small to medium size production quantities are anticipated.

Hemkens' device appears to be more focused on the sales display and marketing aspects of the device rather than on the angler's streamside needs.

Ostenberg's device provides access to the tippet material end for grasping, whereas no similar provision is indicated by Hemkens.

Neither of the above Ostenberg or Hemkens devices provides a means for quickly identifying line sizes in the spool stacks. Only the endmost spools reveal labeling on their side panels.

The issue of fishing vest pocket bulk created by stacked spools has been addressed by inventions for pinning or clipping the spool stack onto the vest or attaching the stack to a neck lanyard. See, for example, U.S. Pat. No. 5,915,947 to Tomlinson. The stack of spools then dangles free possibly amid other dangling accessories the angler already employs. This creates increased potential for line tangles or fishing gear snags as the angler passes through streamside bushes and trees. Dangling devices inevitably snag on other objects, as well, and often get lost. All gear is ideally stored inside pockets to preclude loss and snagging of gear.

These and other solutions to the problem of leader tippet storage are predicated on a very questionable premise, namely, that the leader necessarily has to be stored on spools. The belief underlying this premise is that the leader must be straight when it is removed from the storage device, be it a spool or other device. U.S. Pat. No. 4,290,233 to Ostenberg et al. illustrates this point through the incorporation of a mechanism for uncurling the leader as it comes off the spool. Contrary to this view are the following facts:

(a) Modern day tippet materials are much softer and more supple than those of years ago and therefore exhibit much less leader memory, the characteristic that results in curling and kinking.

(b) Residual curls or kinks in the material after removal from the storage device are of no consequence in streamer, wet fly or nymph fishing since the weight of the fly and terminal rig combined with the force of the stream current remove any memory-induced slack from the leader.

(c) Curling and kinking naturally disappear when the leader is in use. (This is not true of the "pig tailing" issue that exists in the material near the knotted fly but this is an issue independent of leader storage device.)

(d) A non-straight leader is actually highly desirable for presentation of the fly in dry fly fishing so as to avoid any trace of cross-current drag in presentation of the fly, as taught by the renown fly-fishing expert, George Harvey, long time professor of fly-fishing at Penn State University.

(e) Commercially available leader straighteners are available for those who nonetheless insist on fishing with straight leaders.

(f) Curls or kinks in the leader can be largely removed by simply pulling the leader taut with the hands as when snugging up the knot after tying on a fly or tying two tippet pieces together.

Other leader storage systems achieve compactness by foregoing spools, and instead, store the leaders on thin, card-like devices.

The device of U.S. Pat. No. 3,785,080 to Wallace is intended for storage of both leader terminal hardware and leader as a unit. It is slim, compact, and has dedicated storage space for four different leader materials in ample quantities, and, desirably, provides visibility of remaining amounts of material. However, the leader retention method, slotted pegs inserted into holes in the board compromise the inherent compactness of the board by jutting out of the surface thereby impeding insertion into and removal from a pocket. Further, the pegs being non-captive to the board are prone to loss. A further very important disadvantage is that if the device is used without hooks or swivels, as it would be for fly-fishing tippet materials, then there is no means provided to quickly and easily grasp the tippet material ends. The tippet material would lie flush with the surface of the board making it extremely difficult to grasp without a pick-like tool. In addition no means is provided for identifying the various leader sizes held on the card.

Other card-like leader storage devices include U.S. Pat. No. 966,609 to Shannon and U.S. Pat. No. 2,663,114 to Warner. Shannon's device satisfies the need for slimness and compactness but works only for leaders with hooks attached and therefore is unsatisfactory for the storage of leader tippet material. Warner's device is also compact and card-like. It can store leader materials without hooks, swivels or other hardware attached. It embodies, slimness and compactness but lacks the fundamental attribute, however, of being able to neatly store large amounts of leader material of different sizes in a neat, compartmentalized manner. It is not streamlined for easy, snag-free insertion into and removal from a pocket.

None of the devices described in the above referenced patents possesses all of the features of the ideal, leader tippet storage device, namely:

(1) slim, compact size for slipping easily into and out of a shirt or vest pocket
(2) storage of four or more leader tippet sizes on a single device, each with its own dedicated area for storage
(3) tippet material lengths equal to or greater than current tippet spools (30 m)
(4) labeling which allows unambiguous, quick identification of leader tippet sizes
(5) quick and easy finding and grasping of leader tippet ends
(6) easy tippet material removal and length measuring capability
(7) secure retention of tippet ends to prevent unraveling when not in use
(8) readily changeable size labels
(9) complete visibility of the amounts of tippet material remaining in all sizes
(10) capability to firmly secure the ends of very fine tippet materials, e.g. 7×
(11) simplicity in design and low cost in manufacture

SUMMARY

A compact shirt pocket size device is disclosed for neatly and securely storing multiple leader tippet materials of various sizes, and permitting easy identification and grasping of leader ends for removal of the material from the device. In preferred embodiments the tippet storage device includes a card shaped base with corresponding notch pairs in the top and bottom edges into which a leader may be wound. The beginning end of the leader may be captured and held in place by additional coils of leader wrapped over the beginning end. Alternatively, structure may be provided to secure the beginning end to the base. The trailing end of the leader would be captured to be conveniently secured to the base. Preferably, a slit in the top edge of the base communicates with a recess into which a leader retaining pad is mounted, so that the leader end may be inserted through the slit into a cut in the pad so that the leader is removably held in place with no loose ends. A surface recess such as a size label recess is contemplated over which the leader end extends at an angle spaced from the wound leader coils disposed in the notches to reach the slit. Thus, the leader end is conveniently disposed over a recess in the surface of the base to facilitate grasping by the user to remove the leader end from the retaining pad for unwinding a desired length of leader.

In use, a leader to be stored is wound around the base in coils wrapped into a corresponding notch pair. The end of the leader is disposed across the base surface recess and the leader end is inserted into the slit into the retention pad to secure the leader in place. Preferably, the recess or base contains marking(s) identifying the leader size. The base has rounded corners and the retention pad is recessed into the base so there are no loose or sharp edges to catch on clothing, such as if the device is to be stored in a pocket.

When it is desired to remove a section of leader, the device is removed from the pocket or other storage location, the leader end is conveniently grasped at the recess and pulled free of the retention pad, and the desired length of leader is unwound from the base. Once the desired length has been cut off, the remaining trailing end may be inserted through the slit into the retention pad so that the leader remains easy to access should the need for additional leader of that size arise.

In preferred embodiments notch pairs, slits and retention pads for a plurality of leaders are provided on a single base card. Further, labeling may be provided, possibly in a label recess that facilitates grasping the leader, to identify the size leader associated with a given notch pair.

DESCRIPTION OF THE DRAWINGS

The appended drawings constitute part of the disclosure and are meant to illustrate but not limit the invention.

DETAILED DESCRIPTION OF PREFERRED EMBODIMENTS

Figure 1A:
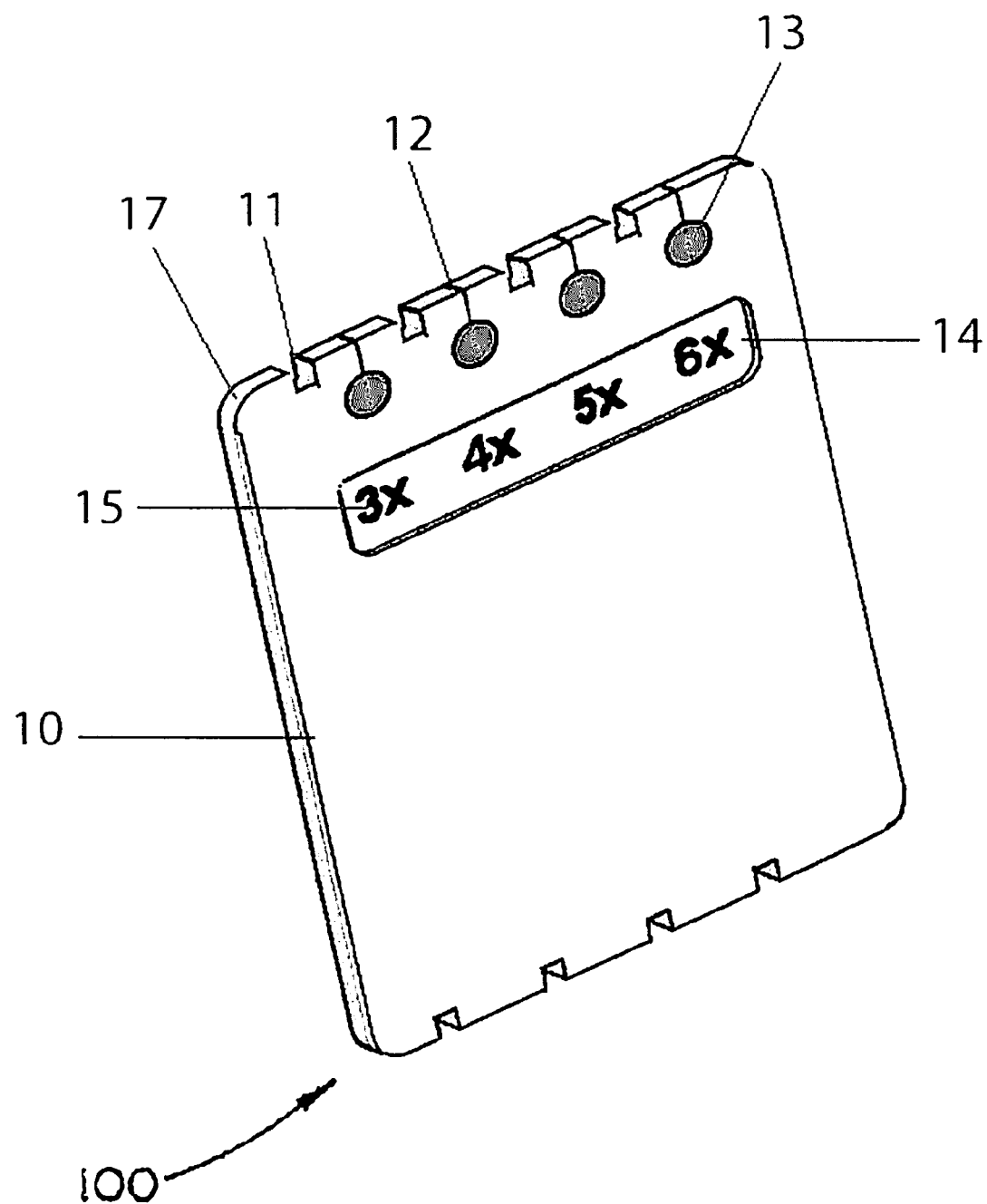
FIG. 1A is a shaded model perspective view of a leader tippet storage device in accordance with an embodiment.
Figure 1B:
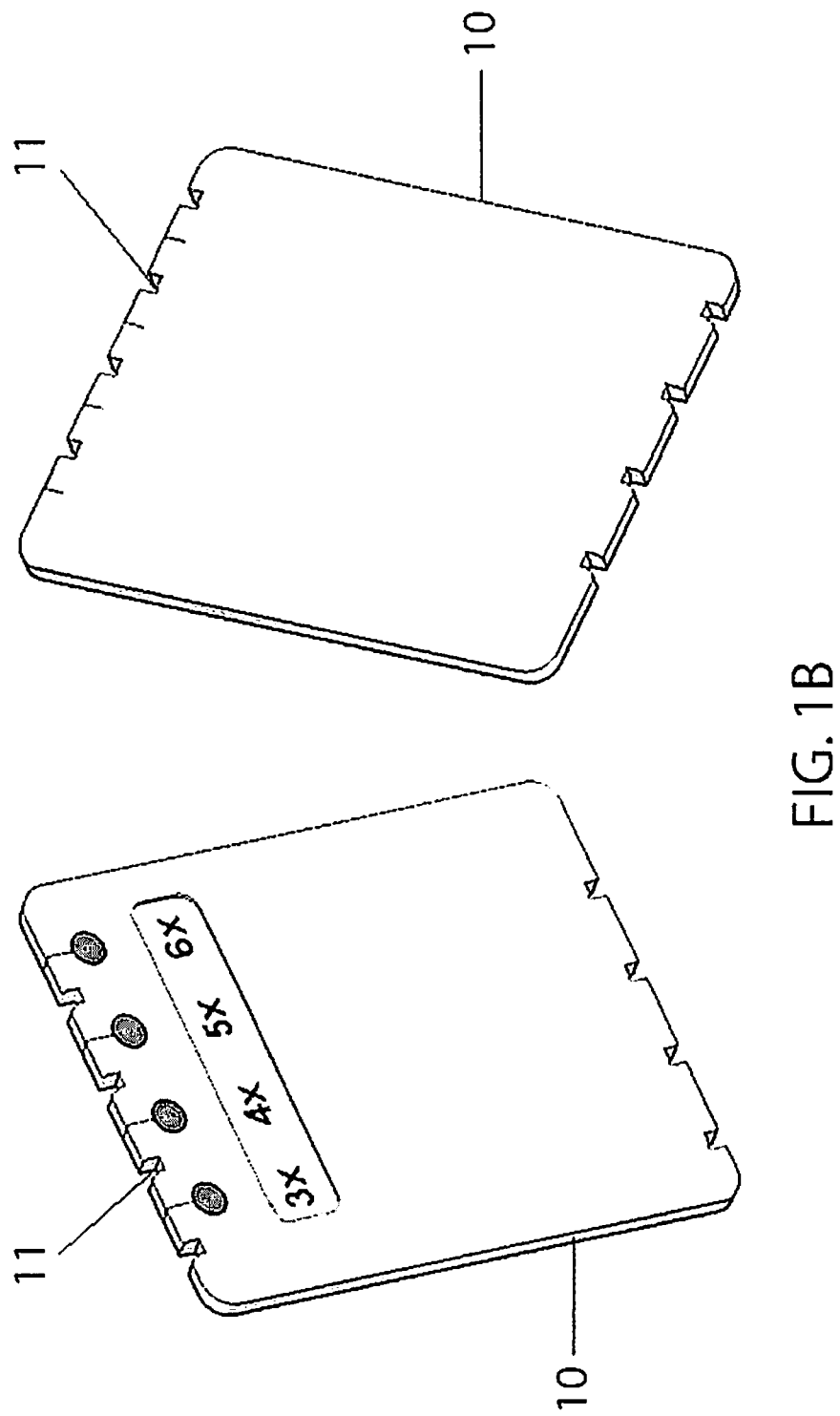
FIG. 1B illustrates front and rear views of the device of FIG. 1A.
Figure 2:
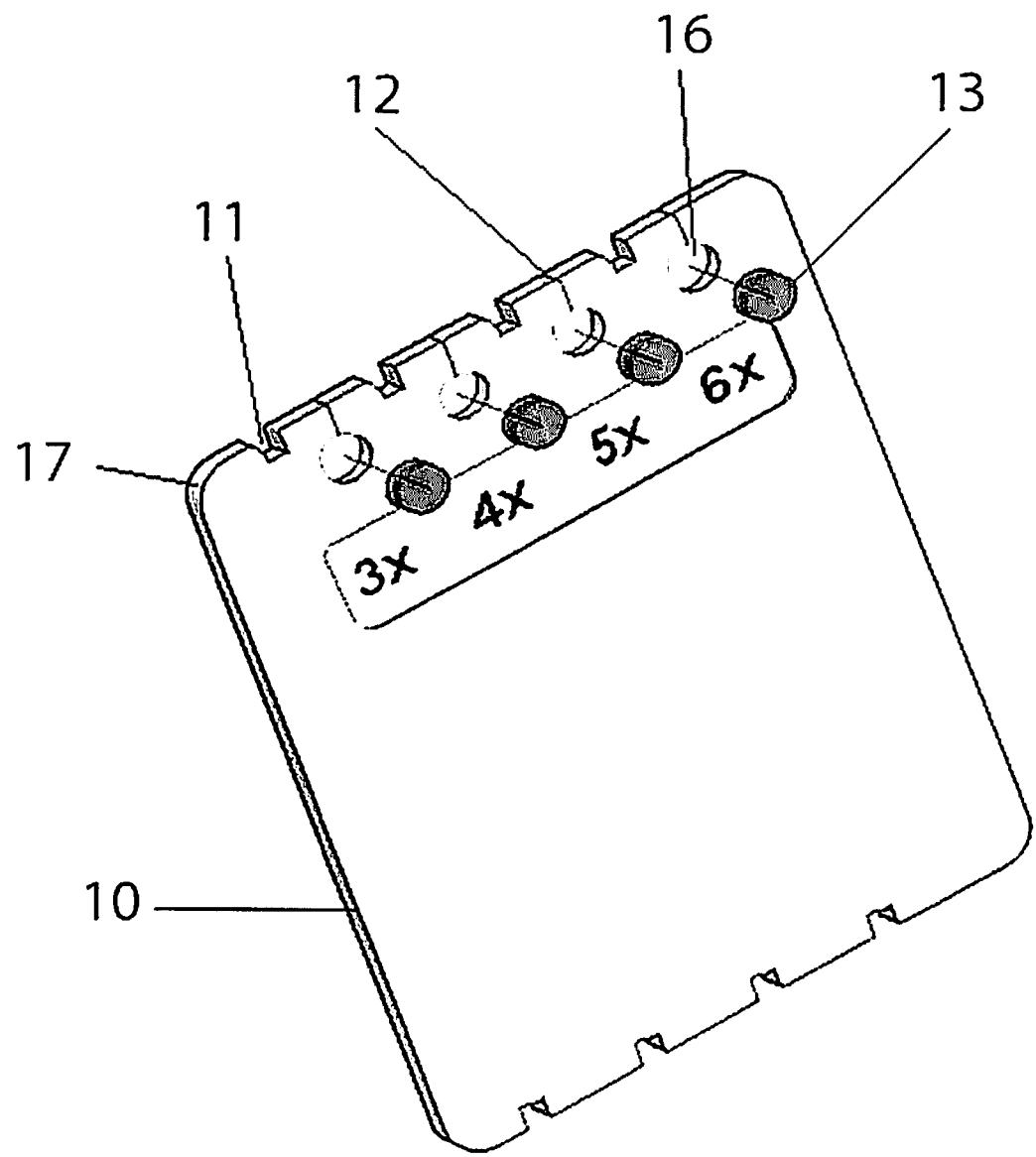
FIG. 2 is a perspective view with parts separated, of the embodiment of FIG. 1A.

Preferred embodiments will now be described with reference to the drawings, which form and constitute apart of the disclosure, and in which like reference numerals are used to designate like parts. In accordance with the disclosure, an improved line storage device 100 for storing leader tippet materials is provided. Line storage device 100 includes a card-like base 10 having front and back surfaces, side edges and top and bottom edges notch pairs 11 cut into the top and bottom edges in aligned arrangement, slits 12 cut in to the top edge adjacent each top edge notch 11, a size label recess 14 and leader retention pad recesses 16. Leader retention pads 13 are fixed into the leader retention pad recesses and leader size labels 15 are affixed in the size label recess. FIG. 1B shows the front surface and rear surface of base 10 in side by side fashion.

Base 10 is sized and shaped to permit easy insertion and removal of the device from a shirt or fishing vest pocket. Dimensions are nominally 4 inches high by 3 inches wide by ⅛ inch thick. Base thinness, of ⅛ inch or thereabouts, and rounded corners 17 facilitate insertion and removal from a pocket, as do base 10 edge chamfers which run around the periphery of both sides of the device. The small size, round corners, and chamfers of base 10 make the device easy and comfortable to hold, being similar in this respect to the size and shape of traditional playing cards. Base 10 may be made of wood, plastic or any other material of sufficient rigidity to prevent base 10 from buckling when the leader materials are wound onto it and as the device is handled by the user. If made from wood, strong hard woods with the grain oriented along the long dimension of base 10 are preferred.

Notch pairs 11 in the top and bottom edges of the base 10 may have a width of 0.125 inches and depth of 0.150 in. Notches of such dimensions have been found to be sufficient to store full 30 meter lengths of tippet materials in sizes 3× through 6×, which satisfies most of the needs of a large majority of fresh water anglers. The notch pairs 11 may be evenly spaced across the length of the top and bottom edges of the base, i.e., the width of the base, resulting in spacing of four notches along the edges of about 0.60 inches. As shown, base 10 may include 4 notch pairs 11 to accommodate four different tippet sizes, while allowing sufficient space between the stored materials for easy access to the leader ends secured by retention pads 13.

Figure 4:
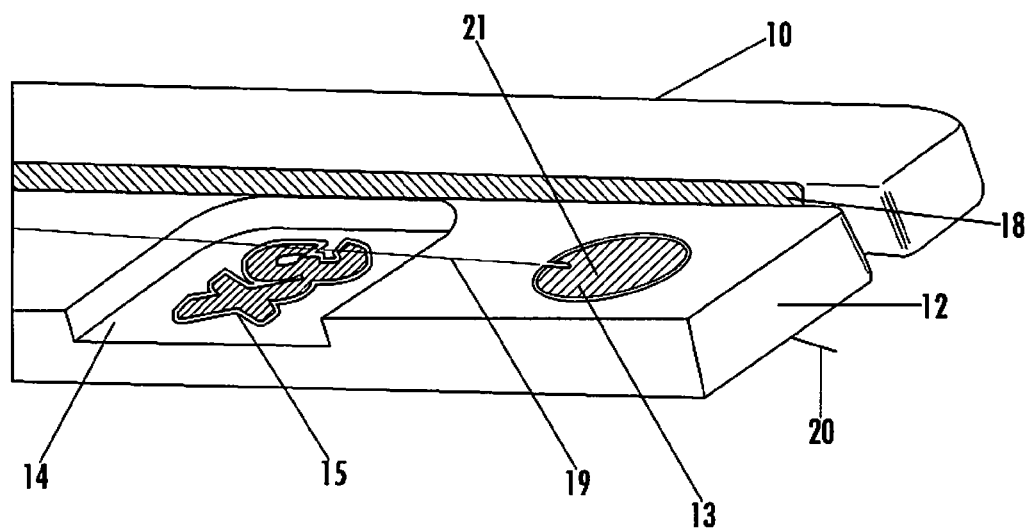
FIG. 4 is an enlarged cut-away view of a portion of FIG. 3, showing details of the leader retention mechanism and convenient access for grasping the leader.

Size label recess 14 provides the free space necessary between the surface of base 10 and leader strand 19 to permit easy grasping of the leader by the user's fingers, as shown in FIG. 4. A depth of about 0.060 in. for recess 14 from the face of the base is satisfactory to accomplish this. Without the free space provided by recess 14, very fine leader strands, for example 6× (0.004 in, diameter) would be extremely difficult to grasp with the fingers. The width of recess 14 across the length of base 10 is similarly governed by the space necessary for the fingers to penetrate into recess 14 to grasp leader strand 19. A width of recess 14 of about 0.50 in. is believed to be ample in this regard. Recess 14 length, nominally 2.30 in., spans all leader strands 19 of all stored materials, allowing easy access to all. Of course, individual label recesses could be provided for each leader rather than providing one continuous recess across all leaders.

Recess 14 also protects size label 15, typically an adhesive backed label, from snagging and being torn away by objects in the pocket containing tippet card 100 or from day-to-day wear and tear.

Labels 15 can be replaced by the user and customized to his or her preference. The 0.50 in. recess 14 width conveniently accepts labels made from office labelmakers as well as computer printed labels. Labels 15 can be annotated with further information desired by some anglers including leader material purchase date, type and manufacturer.

Slits 12 guide leader ends 20 into leader retention pads 13 and are nominally 0.010 in. wide, 0.175 in. long and fully penetrate base 10 from the adjacent edge to the retention pad recess. Slits 12 are narrow enough to accurately guide leader ends 20 into retention pad slits 21 and wide enough to accept leader sizes up to 1× (0.010 in.). Slits 12 begin at the top edge of base 10 and terminate at the points of tangency with pads 13.

Leader ends 20 are drawn into retention pad slits 21 of retention pads 13 and locked in place by the compressive forces exerted by elastomeric retention pads 13. Retention pad slits 21 possess virtually no width since they are created with a thin blade which removes virtually no material from pad 13.

Referring to FIG. 4, slit 21 extends diagonally through pad 13 in the plane located midway between the two planes defined by the walls of slit 12. Slit 21 may be created by inserting a thin cutting blade into slit 12 and rotating it through pad 13 until the edge of the blade arrives at the lower end of pad 13.

Leader retention pad 13 is nominally about 0.25 in. in diameter and 0.100 in depth. The retention pad upper surface is flush with the top surface of base 10 and its lower surface preferably is in contact with the flat surface of retention pad recess 16. Pad 13 is secured to base 10 either by the compressive forces of a forced fit or by a cement which should be compatible with both the elastomeric material of pad 13 and material of base 10. Pads 13 can be die cut from rubber sheet or be sliced from rubber cord of approximately the same diameter as recess 16. The rubber cord is sliced off flush with the top surface of base 10 after insertion into recess 16, following application of cement to recess 16. Alternative materials for the pad 13 are contemplated, such as polymeric materials with suitable elastomeric properties.

Figure 3:
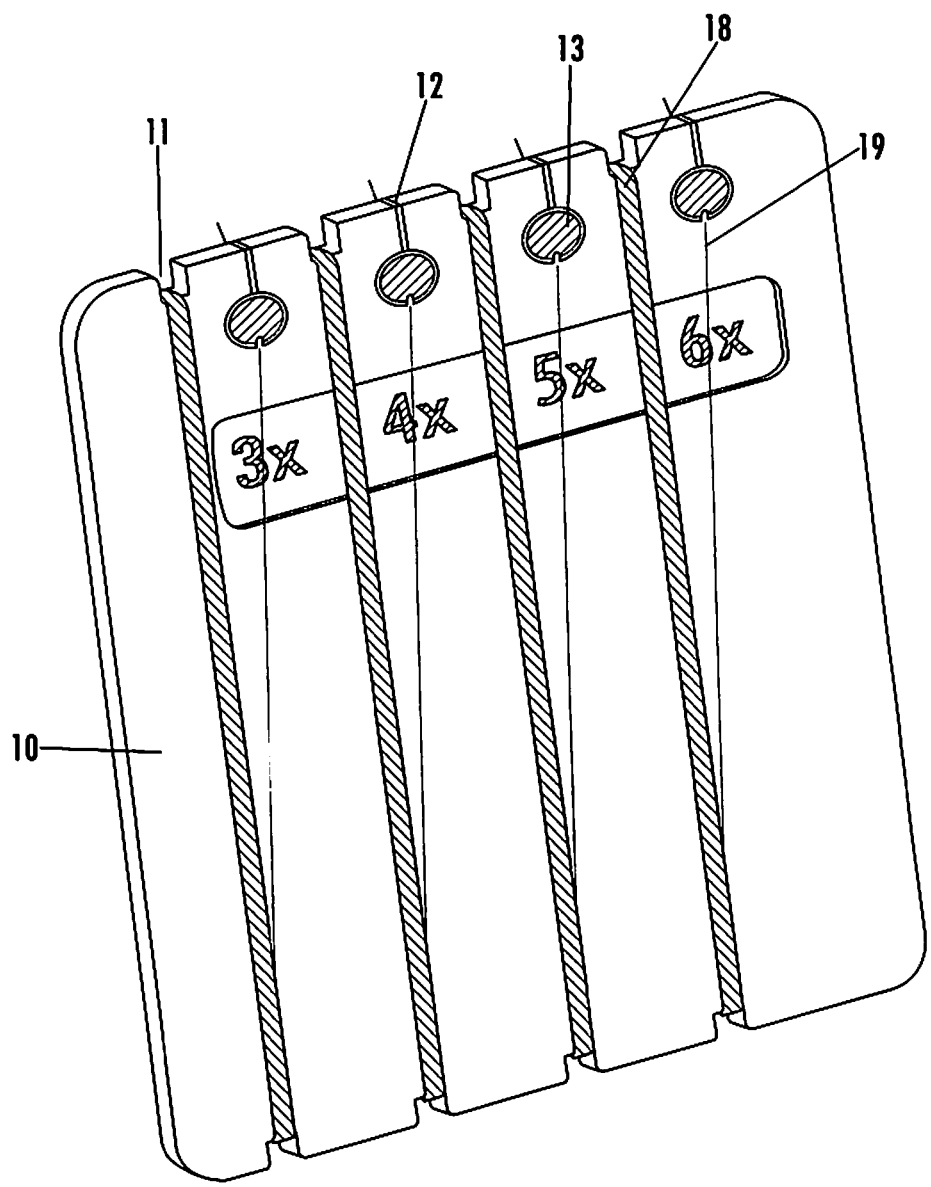
FIG. 3 is a perspective view illustrating the embodiment of FIG. 1A holding four leaders.

In one embodiment, base slits 12 align collinearly with pad slits 21. Further, slits 21 preferably pass through the center points of pads 13. Base slits 12 and pads 13 are located midway between adjacent notch pairs 11 so that a leader strand 19 runs diagonally from lower notch 11 to pad 13, as shown in FIGS. 3 and 4. Leader strand 19 thereby, very desirably, becomes separated from leader coils 18 and lies approximately midway between adjacent sets of coils 18 at the point where strand 19 crosses size label marking 15. This configuration makes the leader strands 19 easy to find since they are well separated from coils 18 and lie midway between same. Further, leader strands 19 are easy to grasp due to the ample free space between said strands and the bottoms of recesses 14. Tippet card 100 manufacturing costs are low due to the use of inexpensive materials, low number of parts and the need for only straightforward, simple machining operations. Injection molding is suitable for base 10 for very large volume production. For small or medium production lots, manufacture by computer-controlled (NC) machines is more economical. The low manufacturing costs achieved thereby achieved result in very substantial product gross margins for a product in a marketplace not big enough to warrant the costs of injection molding tooling.

For a description of the operation of tippet card 100 refer to FIGS. 3 and 4. Leader tippet coils 18 are wound around notch pairs 11, such as by transferring leader tippet materials from commercially available spools on which they typically are sold. Spools typically contain 30 meters of material but, advantageously, greater amounts of material can be loaded onto tippet card 100. This is particularly useful in the more commonly used tippet sizes. Winding the leader onto the base in the notches may be performed by the angler, or it is contemplated that one or more leaders may come pre-wound onto the base. Both manual and automated winding of leader material onto the base are contemplated.

After each leader is wound onto the card, the end of the last coil of coils 18 is held such that leader end 20 may be grasped and pulled into slit 12 and drawn under tension into pad slit 21, resulting in leader strand 19 becoming taut and leader end 20 secured in pad 13. Leader end 20 may then be snipped off close to slit 12 resulting in a neat tippet card 100, free of loose, uncontrolled leader ends which can be troublesome for the angler. Optionally, the leader tag at the beginning end of coils 18 can be snipped off near notch 11 for neatness. The beginning end of the leader may be captured and held to the card by overwinding the coils of the leader over the beginning end. Alternatively, a structure may be provided to capture the beginning end and holding it to the base, such as, for example, by providing a recessed pad similar to pad 13 at the bottom of the base adjacent each notch to receive and hold the beginning end of the leader.

When the angler desires a particular length of tippet material he or she grasps leader strand 19 at the point where it crosses size marker 15 and pulls it directly up in a direction perpendicular to base 10, thereby freeing leader end 21 from its housed position in pad 13.

The angler then measures off the desired amount of leader material by counting the number of coils removed and then multiplying by 8 inches, the straight line length of a single coil. Thus, if a 24 inch tippet is desired, the angler unwinds 3 coils. The remaining leader is then secured back into retention pad 13 and the 24 inch tippet length is cut off near slit 12, as described above.

An additional feature which can be added to tippet card 100 is a built-in cutter for snipping off leader ends 20. This can be accomplished in a number of different ways. One way is to saw a slit into an edge of base 10, cut a V-notch on the edge of base 10 at the location of the slit, followed by the insertion of a thin razor blade-like component which would be force fitted or otherwise secured into the slit. The desired leader tippet length would be cut off by drawing it down into the notch with slit containing the blade. Since the blade would be recessed from the edge of base 10 and buried within same there would be no danger of cutting oneself or of cutting objects in the pocket where tippet card 100 is stored.

Some users may prefer to clip card 100 to a lanyard rather than keep it in a pocket, in which case a hole of suitable diameter to accept the lanyard clip can be bored into an open corner space of card 100.

Base 10, if made from wood, can receive a water-resistant finish of varnish, paint or other substance including teak or tung oil.

Adhesive-backed product logo label or other manufacturer's labels can be applied to the front or rear or both surfaces of tippet card 100.

Laser-etched or wood burned permanent labeling can be substituted for the above adhesive-backed labels.

Alternative embodiments of tippet card 100 exist which comprise many of the features of the main embodiment described above but which may differ in size and material make-up.

A saltwater fishing version of tippet card 100 might employ a base 10 made from a material other than wood, for example marine aluminum, to withstand the harsher saltwater environment. The much larger diameter leaders used in saltwater fishing would dictate a change in leader retention pad 13 size and pad slit 21 width. Additional width in slit 21 might now require pad 13 material removal for even the smallest diameter saltwater leader to be encountered. Corresponding changes to the width of base slits 12 would be required. The much greater diameter of saltwater leaders would further dictate an enlargement of notches 11 in order to achieve an ample amount of leader storage and base 10 size would likely be increased also to extend the distance between notch pairs 11 in order to achieve greater leader storage capacity.

A greater number of tippet sizes can be stored on tippet card 100 by increasing the number of notch pairs 11, and corresponding slits, 12 and pads 13. This, of course, would be at the expense of reduced handling ease and ease of inserting and removing from a shirt or vest pocket.

A lesser number of stored tippet sizes and correspondingly reduced card 100 width is of course possible by simply not including the leftmost or rightmost pairs of notches 11, associated slits 12, and pads 13. In accordance with the present disclosure, at least one notch pair, one slit and one retention pad is contemplated, although a plurality of notch pairs, slits and retention pads is preferred. The retention pads may be silicone rubber, or any other elastomeric material suitable for insertion into the retention pad recess and to receive and hold the end of the leader.

If the number of stored tippet sizes is only one, a system of interchangeable single-size cards can be devised with suitable means for linking together to maintain the "all-leaders-in-one-place" feature of tippet card 100.

Tippet card 100 can alternately be adapted by the angler to store full leaders, typically, tapered leaders between 7 and 15 ft. in length as well as to temporarily store damaged tippets in need of repair.

Advantages of tippet card 100 not found in combination in any of the prior tipped storage system include:
1. slim, compact size for slipping easily into and out of a shirt or vest pocket
2. storage of four or more leader tippet sizes on a single device, each with its own dedicated area for storage
3. tippet material lengths equal to or greater than currently available tippet spools (30 m)
4. labeling which allows unambiguous, quick identification of leader tippet sizes
5. quick and easy finding and grasping of leader tippet ends.
6. easy tippet material removal and length measuring capability
7. secure retention of tippet ends to prevent unraveling when not in use
8. readily changeable size labels
9. complete visibility of the amounts of tippet material remaining in all sizes
10. capability to firmly secure the ends of very fine tippet materials, e.g. 7×, 8×
11. simplicity in design and resultant low cost in manufacture
12. easy design adaptability to related applications Accordingly, the reader will see that the leader tippet card means for storing leaders offers advantages far beyond any such device shown in the prior art and further is revolutionary in the field of angling accessories. The current approach for storing several leader materials of different sizes by stacking leader spools one on top of the other is not only cumbersome and inconvenient for the angler on the stream but is inherently inelegant and void of creative thinking. The leader tippet card now allows the angler to carry multiple leader tippet sizes on a slim device which slips easily into and out of a shirt pocket instead of pinning a bulky stack of dangling spools onto a fishing vest.

The leader tippet card further allows for the immediate finding and grasping of the ends of the tippet materials desired by the angler. Clear large letter size labeling is always in sight and the retained leader end is very easy to grasp by virtue of the size label recess feature.

In contrast, the leader material size identification in a stack of spools is limited to just the end spool, and not always then because of obscuration of the label on the side of the spool. No means exists for the clear identification of leader sizes on the spools buried in the stack. Grasping the end of a leader issuing from a stack of spools can be difficult especially if it accidentally disappears beneath the elastic retaining ring of the spool. No such issue exists with the leader tippet card since rubber retention pads keep the ends firmly secured in place and are easily found and never obscured by a band or other device.

The presence of the elastic retainer precludes seeing the remaining amount of leader on the spool setting the angler up for disappointment to discover such condition at an inopportune time. On the other hand, with the leader tippet card, remaining amounts of all sizes of tippet materials are clearly and immediately viewable.

Simplicity in design and low cost in manufacture make the tippet card a very viable product. Not only does the device meet all the angler's needs as described above, but it also can be manufactured immediately without special tooling, long development time and large costs. Consisting basically of only two different components, a base made of common hardwood, for example, and four tiny identical rubber pads, the tippet card component costs are almost negligible contributors to the product's total costs. The principal manufacturing cost is from performing the various machining operations, the latter being accomplished straightforwardly with standard shop equipment with very small unit total machining times. Thus, the resultant low manufacturing costs combined with a likely product sell price several times greater than the manufacturing costs create a very attractive business prospect.

Although the description above contains many specific descriptions and uses of the leader tippet card, these should not be construed as setting limits on possible variations of the design and modification of its use. For example, while the impetus for the leader tippet card concept has been the improvement of leader storage for anglers, the same concept can be extended to the storage of line types other than leader tippets. These may include threads, flosses, wires, crewels, yarns, sutures, filaments of various types, etc. In these adaptations, modifications to the device analogous to those mentioned for a saltwater version of the leader storage device would be implemented.

One skilled in the art will appreciate that variations may be made from the specific construction and arrangements described herein, and that such variations and alterations in arrangement are contemplated and within the scope of the appended claims.

I claim:

1. A leader retention system comprising
a base having
   a top edge;
   a bottom edge;
   a first side edge;
   a second side edge;
   a front face;
   a back face;
   at least one pair of corresponding notches in the top edge and the bottom edge of the base configured and dimensioned to receive a length of leader wrapped around the base against the front face and back face of the base;
   a retention pad recess;
   a slit in an edge of the base extending to the retention pad recess to facilitate placement of the leader into the retention pad; and
   at least one retention pad fixedly disposed adjacent one of the notches to receive and hold the leader end, the at least one retention pad including a retention pad slit for receiving a portion of the leader, the at least one retention pad located in the retention pad recess and substantially flush with at least one of the front and back faces of the base, wherein the at least one retention pad is offset from the corresponding pair of notches such that the end of a leader extending to the retention pad extends from the one of the notches at an angle to the axis defined between the pair of notches.

2. The leader retention system of claim 1 wherein the retention pad is an elastomeric pad.

3. The leader retention system of claim 1 wherein the retention pad is silicone rubber.

4. The leader retention system of claim 1 further comprising a plurality of corresponding notch pairs.

5. The leader retention system of claim 4 wherein each notch pair has an associated retention pad.

6. The leader retention system of claim 1 further comprising a label recess in a surface of the base, the label recess disposed below the leader end extending from the notch to the retention pad to facilitate grasping of the leader end by a user.

7. The retention system of claim 1 further comprising at least one indicia attached to the base adjacent a leader providing characteristics of the leader.

8. The retention system of claim 1 wherein the edges of the base are chamfered or rounded to facilitate insertion and removal of the device from a pocket.

9. The leader retention system of claim 1, wherein the retention pad is fixedly attached to the base using a cement.

10. The leader retention system of claim 1, wherein the top edge of the base includes at least one slit for guiding an end of the leader into the retention pad slit of the at least one retention pad.

11. The leader retention system of claim 1, wherein the retention pad slit of the at least one retention pad is oriented towards the front face of the base.

12. A method of storing a fishing leader comprising:
Providing a retention device including a base having
   a top edge;
   a bottom edge;
   a front face;
   a back face;
   at least one pair of corresponding notches in the top edge and the bottom edge of the base configured and dimensioned to receive a length of leader wrapped around the base against the front face and back face of the base;

a retention pad recess;

a slit in an edge of the base extending to the retention pad recess to facilitate placement of the leader into the retention pad; and at least one retention pad fixedly disposed adjacent one of the notches to receive and hold the leader end, the at least one retention pad including a retention pad slit for receiving a portion of the leader, the at least one retention pad located in the retention pad recess and substantially flush with at least one of the front and back faces of the base, wherein the at least one retention pad is offset from the corresponding pair of notches such that the end of a leader extending to the retention pad extends from the one of the notches at an angle to the axis defined between the pair of notches;

winding a leader around the base such that the length of the leader extends around the base against the front face and the back face, and through the notches between the front face and the back face; and placing the leader end in the retention pad.

13. The method of claim 12 wherein the step of placing the leader in the retention pad comprises placing the leader into a cut in the retention pad.

14. The method of claim 12 wherein the step of placing the leader in the retention pad comprises inserting the leader end through a slit extending from an edge of the base to a retention pad recess, and into a cut in the retention pad disposed in the retention pad recess.

15. The method of claim 12 further comprising:

grasping a portion of the leader; and pulling the portion of the leader perpendicularly to the base such that the leader end is released from the at least one retention pad.

16. The method of claim 15 further comprising:

unwinding a desired length of the leader from the base; and cutting the desired length of the leader.

* * * * *